United States Patent [19]

Meyer et al.

[11] Patent Number: 4,591,273
[45] Date of Patent: May 27, 1986

[54] WHISK BEATER

[76] Inventors: Jean Meyer, 8 rue des Fossettes, F 14128 Cormelles le Royal; Manuel A. Gallardo, 11 rue du Temple, 77500 Chelles, both of France

[21] Appl. No.: 589,119
[22] PCT Filed: Jun. 8, 1983
[86] PCT No.: PCT/FR83/00112
  § 371 Date: Feb. 8, 1984
  § 102(e) Date: Feb. 8, 1984
[87] PCT Pub. No.: WO83/04368
  PCT Pub. Date: Dec. 22, 1983

[30] Foreign Application Priority Data

Jun. 9, 1982 [FR] France .............................. 82 10008

[51] Int. Cl.⁴ .............................................. B01F 7/30
[52] U.S. Cl. ..................... 366/288; 366/331
[58] Field of Search ............. 366/197, 199, 204, 261, 366/288, 297, 300, 331, 347

[56] References Cited

U.S. PATENT DOCUMENTS 2,615,690 10/1952 Jepson .............................. 366/197

FOREIGN PATENT DOCUMENTS 1245058 8/1962 Fed. Rep. of Germany .
1477824 3/1967 France .............................. 366/288
 686771 1/1953 United Kingdom .............. 366/288

Primary Examiner—Philip R. Coe
Attorney, Agent, or Firm—Thomas A. O'Rourke

[57] ABSTRACT

A beater of the type that includes a whisk assembly that rotates inside a bowl closed by a lid. The whisk assembly is mounted in a shell which rotates slowly inside the bowl. A seal is provided between the shell and a drive shaft mechanism. The seal is activated in response to movement of the lid off the bowl.

3 Claims, 6 Drawing Figures

WHISK BEATER

The present invention provides a whisk beater which is particularly, but not exclusively, intended for beating egg white stiff.

Beaters of this type are known and in general they comprise two whisks which are made to rotate at high speed in opposite directions. In hand beaters, this rapid rotary motion of the whisks is superposed on a much slower hand motion whose purpose is to ensure that all the ingredients are beaten into a homogenous product.

The present invention relates more particularly to a whisk beater for mounting in a food processor such as that described in French Pat. No. 71 27039 in the name of Pierre Verdun. This type of processor comprises a base housing an electric motor whose shaft projects into a removable bowl and on which various tools can be received. The motor shaft rotates at high speed and some tools, such as knives with curved blades, mix ingredients inserted into the bowl in a homogenous manner. Unfortunately, this tool turns out to be unsatisfactory for beating egg white stiff.

Other food processors provide means for mounting two whisks over the bowl, with the whisks being suspended from a motor shell which includes a cantelever. In order to obtain the above-mentioned simultaneous pair of motions, it is known to cause the whisks to rotate at high speed while the bowl itself is driven at low speed. Such a device is described in U.S. Pat. No. 2,615,690 filed in the name of Jepson.

The present invention provides a whisk beater capable of being mounted on a food processor which does not include a cantelever, but which has a bowl that is closed by a lid, said beater including a mechanism which enables it to provide both of the required rotary motions.

According to the invention, the whisk beater comprises two whisks made to rotate at high speed in opposite directions and mounted in a shell which is provided with drive means, characterized in that said shell rotates at slow speed inside a fixed bowl.

To give an idea of scale, high speed may be taken to mean about 1,500 rpm and low speed about 60 rpm.

Since the shell is included inside the bowl and the drive means are located below the bowl, the mechanism will be subjected, in operation, to splashing. It is therefore important that it should be washable, preferably in a washing up machine. This means that the shell should be sealed so that washing up liquids do not get inside it. Unfortunately, because of the rotating contacts, sealing cannot be suitably provided by conventional means. The present invention provides a solution to this problem.

According to another characteristic of the present invention, since the shell is mounted on a hub which cooperates with the motor drive shaft, resilient means are interposed between the hub and the shell in such a manner as to move a collar against a sealing ring when the device is in the rest position.

Finally, since the whisks and the shell are rotatably driven inside the bowl, it is necessary for a fixed point to be available. According to another characteristic of the invention, the fixed point is provided by the shell bearing against the lid of the bowl. This characteristic has a safety advantage in that the device can thus be operated only when the lid is in a suitable position, thereby preventing fingers from being inserted during operation.

Other characteristics and advantages of the invention appear from the following description of a particular embodiment given solely by way of non-limiting example with reference to the figures, in which:

FIG. 5 is a view similar to FIG. 1, but showing the beater in the rest position.

Figure 1:
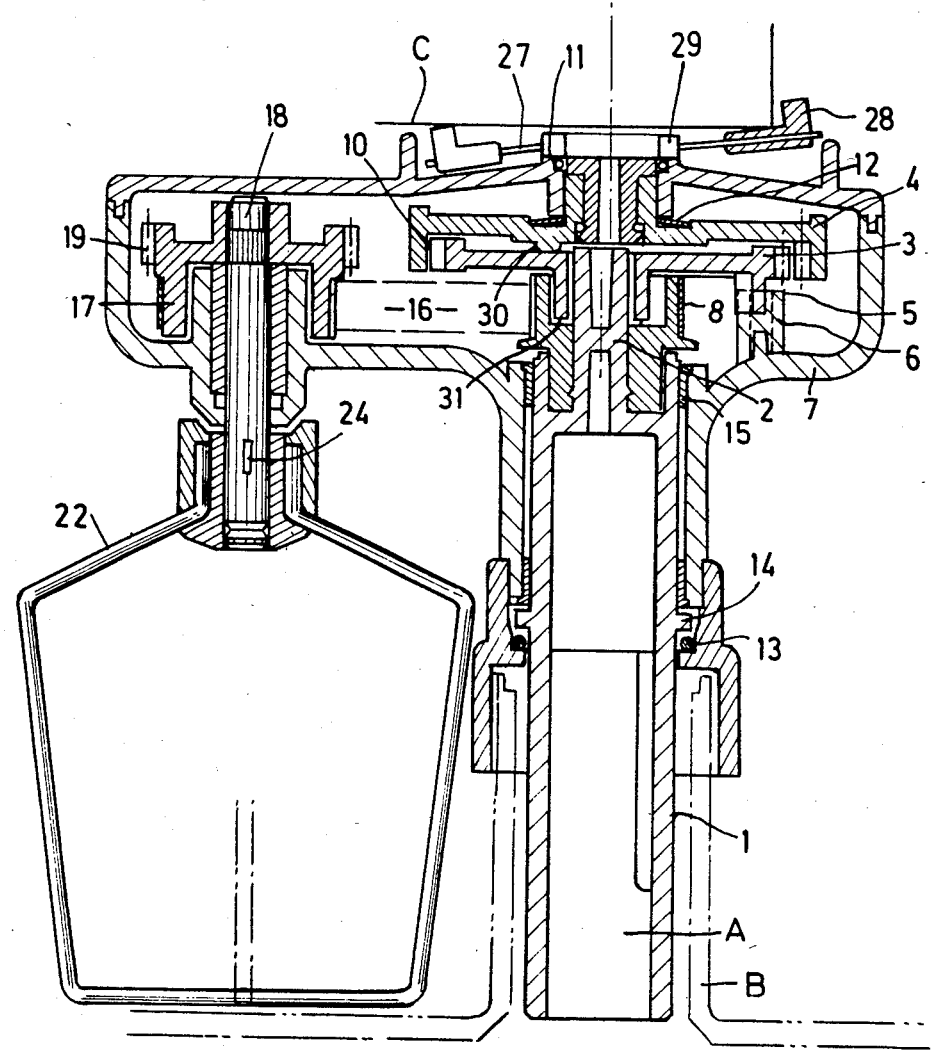
FIG. 1 is a vertical section through a whisk beater in accordance with the invention in its working position.
Figure 4:
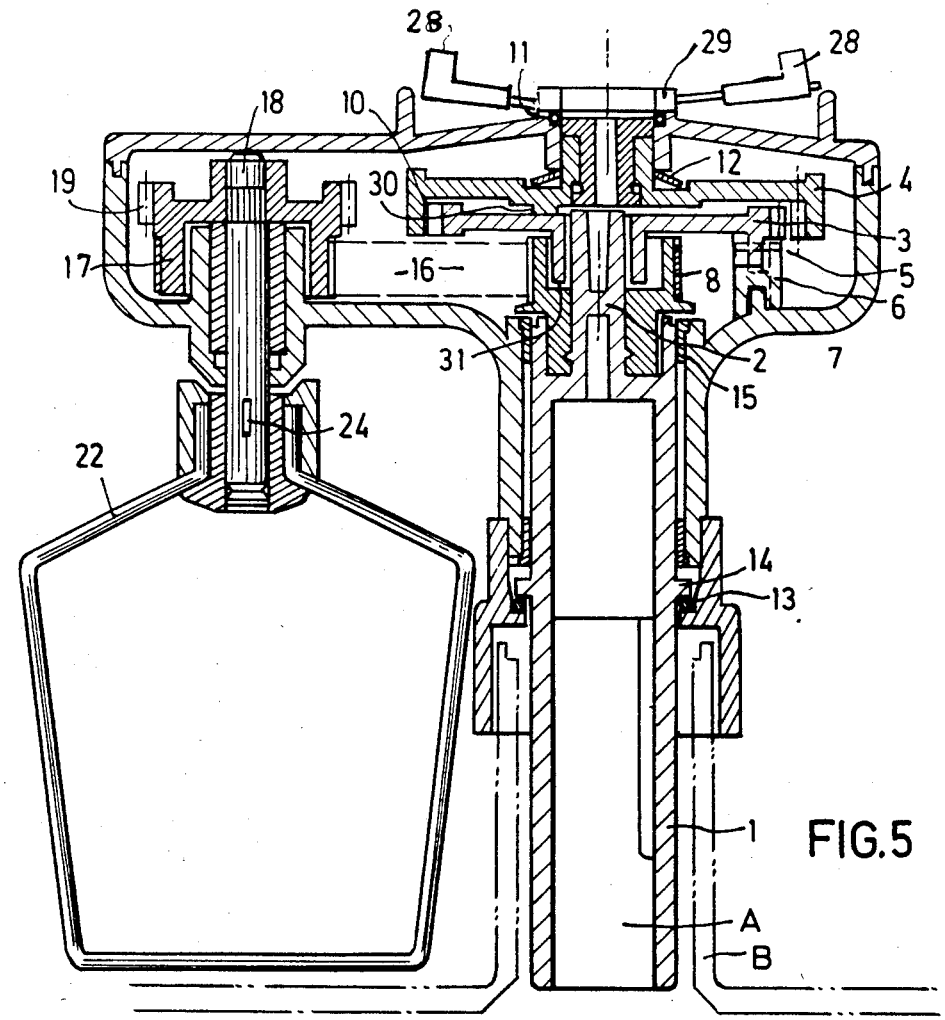
FIGS. 4 and 4a are respectively a diagram showing the principle of shell drive and a section through the teeth.
Figure 4:
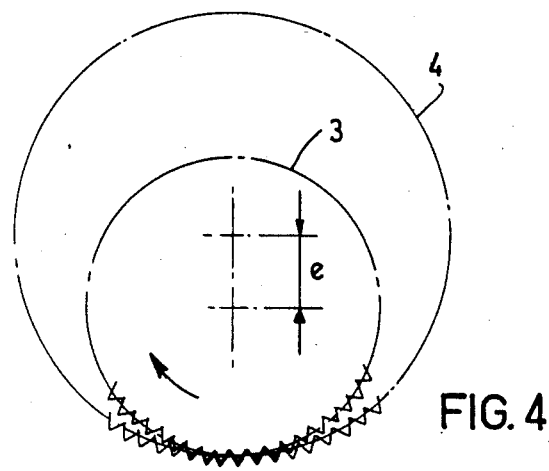
Figure 4A:
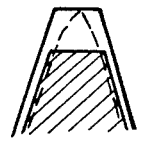

In FIG. 1, the hub of a beater is fixed on the top end of a drive shaft A and is surrounded by a skirt B formed in the bottom of a bowl in order to constitute a food-retaining baffle. At the top end of the hub 1, a shaft 2 is formed which is excentric relative to the axis of the hub and which carries a satellite gear 3. As can be seen better in the diagram of FIG. 4, speed reduction is obtained by the satellite gear 3 rotating in a fixed ring gear 4. The teeth on the gear 3 are of corrected profile to enable the teeth to escape from the teeth of the ring 4. The gear 3 only turns in the fixed ring 4 at intervals determined by the value e of the eccentricity (see FIGS. 4 and 4a). The gear 3 is held fixed by means of a fork 5 on a retainer 6 which is itself fixed to the shell 7. Since the gear 3 has an epicyclic type of motion, the relative rotation of the shell 7 is defined by the meshing frequency of the teeth of the gear 3 in the ring 4, which is itself dependent, in particular, on the excentricity e. In practice, a ratio is calculated such that the shell 7 rotates at about 60 rpm while the drive shaft rotates at 1,500 rpm in the opposite direction. In FIG. 1, the gear 3 meshes with the ring 4 to the left of the figure leaving the right of the the gear free.

Figure 2:
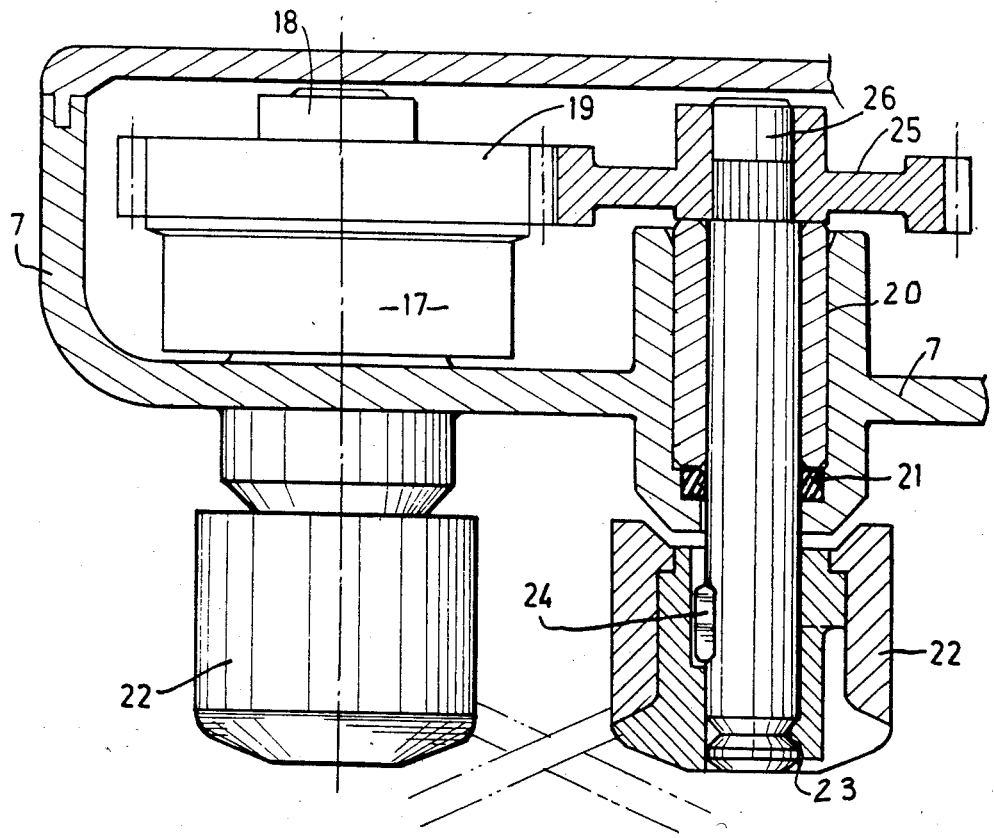
FIG. 2 is a view of the whisk mounting and drive means.
Figure 3:
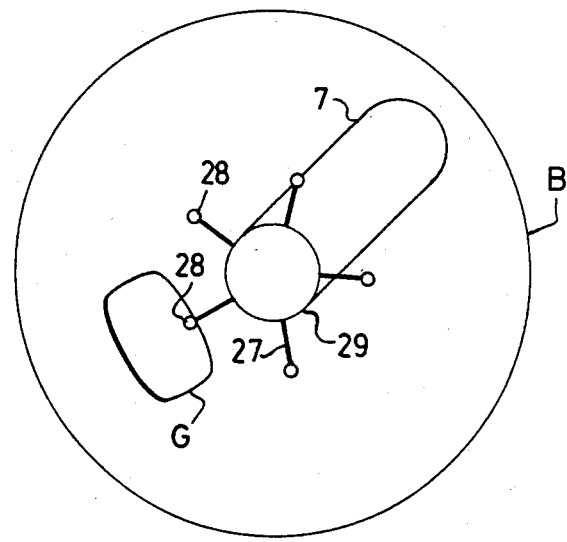
FIG. 3 is a diagram showing the co-operation between the beater and the lid.

At the top of the hub 1 there is also a pulley 8 which is fixed to the drive shaft and which turns at the same speed, ie. at about 1,500 rpm. A belt 16 is mounted on the pulley 8 and it in turn drives a pulley 17 which is fixed to the top of a whisk shaft 18. The pulley 17 has a toothed ring 19 around its top which meshes, as shown in FIG. 2, with a second toothed ring 25 which is fixed to the shaft 26 of a second whisk. Thus, the two whisks are driven in synchronism with the motor drive shaft A. The whisk shafts are mounted inside the shell by means of antifriction rings 20 which leave them free to rotate inside said shell. Sealing is provided at the base of each whisk by four lobes 21. The whisks are snap-fitted to their shafts 18 and 26 by springs 24 and grooves 23. They may thus be disengaged from their shafts for washing up by pressing on the springs 24 while pulling on the whisks.

The above-described assembly is driven in rotation by the output shaft A from the motor. However, in order to ensure that the shell is not driven at the speed of rotation of the shaft A, it is necessary to provide a fixed point. In accordance with a characteristic of the invention, the fixed point is provided by the lid C which is pressed down of the mechanism as a whole without preventing its rotating members from rotating. For this purpose, the fixed gear or ring 4 is fixed to a ring 29 which, in the example shown, is fitted with a star in the form of pads 28 which slide against the inside of the lid until one of them enters the chute G for inserting ingredients while the machine is in operation. Because of the resilience of the arm 27, the pad 28 moves up inside the chute and stops the ring 29 from rotating, whereupon the ring 4 stops rotating and becomes a fixed ring. A sealing ring 11 is disposed between the ring 4 and the shell 7. Given the slow rotation speed of the shell 7, the sealing ring 11 can readily withstand being in contact with a moving member and a fixed member.

It is also possible to provide a central non-circular cavity in the inside of the lid C to receive the top of the beater and prevent it from rotating. In this case, the ring 29 is no longer necessary.

A Belleville type washer 12 is inserted between the shell 7 and the fixed gear 4. Its function is described below. The satellite gear 3 is mounted free to rotate about the excentric shaft 2 by means of an antifrication ring 31. It is held against the ring 4 by three pegs 30, only one of which can be seen in FIG. 1. The shell 7 rotates about the hub 1 by means of antifriction rings 15 which constituted a bearing. To prevent overheating, the contact surfaces are advantageously made of different plastic materials such as "Delrin" and polyamide.

Substantially half way up the hub 1 there is a collar 14 below which there is a sealing ring 13. In the operative position, the sealing ring 13 and the collar 14 are not in contact. The relative speed of rotation between the hub and the shell is about 1,560 rpm, and at such speeds the sealing ring would deteriorate rapidly. However, when the beater is removed from the bowl, after the lid has been taken off, the shell 7 moves down relative to the device as a whole and the ring 13 is compressed against the collar 14, thereby sealing the beater so that it can be put in a washing up machine. A beater in accordance with the invention thus has the particularity of being unsealed during operation, thereby avoiding the problem of a high speed rotary seal, while being sealed when not in operation. As can be seen clearly by comparing FIGS. 1 and 5, the shell is moved relative to the hub by pressure from the lid compressing the "Belleville" washer 12 when the beater is installed in the food processor. When the lid C is taken off (FIG. 5), the washer 12 expands. This causes the shell 7 to lift, thereby compressing the sealing ring 13 against the collar 14. Sealing is provided at the top of the beater by the sealing ring 11 as described above.

FIG. 2 is a section in a vertical plane and on a larger scale showing the end of the shell 7 and the mountings for the two whisks 22 of which only the heads are visible. The vertical shafts (18, 26) are fixed to respective toothed rings (19, 25) which drive them at the rotation speed of the shaft A and in opposite directions. Each shaft rotates inside a bearing 20 which is integral with the shell 7, and which includes a sealing ring 21 to insulate the mounting from the contents of the work bowl.

Naturally, many variants can be devised without going beyond the scope of the present invention, in particular by substituting equivalent technical means.

We claim:

1. A beater comprising a whisk assembly, a bowl, a lid for closing the bowl, a shell mounting said whisk assembly therein and which is in turn mounted for rotation inside the bowl, a drive shaft, a mechanical link between said drive shaft and the shell, the whisk assembly being driven by the shaft, characterized in that a resilient member is disposed between the shell and the mechanical link, and including a sealing ring and a seat for creating a seal between said drive shaft and said shell, said resilient member being compressed by pressure from the lid closing said bowl and causing downward translation of the shell, which causes movement of the sealing ring away from its seat, and an unlocking of the lid causing the seat to be pressed against the sealing ring.

2. A beater according to claim 1, characterized in that the mechanical link comprises a toothed ring which is eccentrically mounted relative to the drive shaft and which periodically comes into contact with a fixed gear, the frequency of contact defining a step-down ratio.

3. A beater according to claim 1 or 2, characterized in that it has a top end which is received in a non-circular cavity formed in the lid.

* * * * *